United States Patent
Chinnici et al.

(10) Patent No.: US 8,922,843 B2
(45) Date of Patent: Dec. 30, 2014

(54) IMAGING PRODUCT LAYOUT SYSTEM

(75) Inventors: Richard J. Chinnici, Webster, NY (US);
Ronald S. Cok, Rochester, NY (US);
Christopher Lyons, West Chester, PA (US); Daniel E. Gross, East Bethany, NY (US)

(73) Assignee: Kodak Alaris Inc., Rochester, NY (US)

( * ) Notice: Subject to any disclaimer, the term of this patent is extended or adjusted under 35 U.S.C. 154(b) by 344 days.

(21) Appl. No.: 12/914,074

(22) Filed: Oct. 28, 2010

(65) Prior Publication Data
US 2012/0105874 A1 May 3, 2012

(51) Int. Cl.
*H04N 1/387* (2006.01)
*G06T 11/60* (2006.01)
*H04N 1/00* (2006.01)

(52) U.S. Cl.
CPC ............ *H04N 1/387* (2013.01); *H04N 1/00167* (2013.01); *H04N 1/0019* (2013.01); *H04N 1/00188* (2013.01); *G06T 11/60* (2013.01)
USPC .......... 358/450; 358/1.9; 358/1.18; 358/3.28; 358/540

(58) Field of Classification Search
None
See application file for complete search history.

(56) References Cited

U.S. PATENT DOCUMENTS

| | | | | |
|---|---|---|---|---|
| 6,288,719 | B1* | 9/2001 | Squilla et al. | 715/805 |
| 6,362,900 | B1* | 3/2002 | Squilla et al. | 358/442 |
| 6,584,281 | B2* | 6/2003 | Kamata | 396/60 |
| 7,317,563 | B2* | 1/2008 | Kinjo | 358/540 |
| 7,340,676 | B2 | 3/2008 | Geigel | |
| 8,139,826 | B2* | 3/2012 | Ryuto et al. | 382/118 |
| 8,345,057 | B2* | 1/2013 | Ptucha et al. | 345/581 |
| 2004/0088326 | A1* | 5/2004 | Lin et al. | 707/104.1 |
| 2009/0051971 | A1* | 2/2009 | Nakamura | 358/1.18 |
| 2009/0196520 | A1* | 8/2009 | Devoy et al. | 382/254 |
| 2010/0027071 | A1* | 2/2010 | Schindler et al. | 358/1.18 |
| 2010/0179914 | A1* | 7/2010 | Levin et al. | 705/318 |
| 2011/0029553 | A1* | 2/2011 | Bogart et al. | 707/769 |

FOREIGN PATENT DOCUMENTS

JP 2009-045139 * 3/2009

* cited by examiner

*Primary Examiner* — Dung Tran
(74) *Attorney, Agent, or Firm* — Hogan Lovells US LLP

(57) ABSTRACT

An imaging kiosk comprises an image printer, a frame-specification reader for reading frame-specification information specifying two or more image openings in a picture frame, an image-acquisition device, and a computer system for controlling the image printer, the frame-specification reader, and the image-acquisition device. Images are acquired for rendering a single printable image having the two or more acquired images located in positions corresponding to the two or more image openings, and for printing the rendered image to make a frame-matched multi-image print.

19 Claims, 16 Drawing Sheets

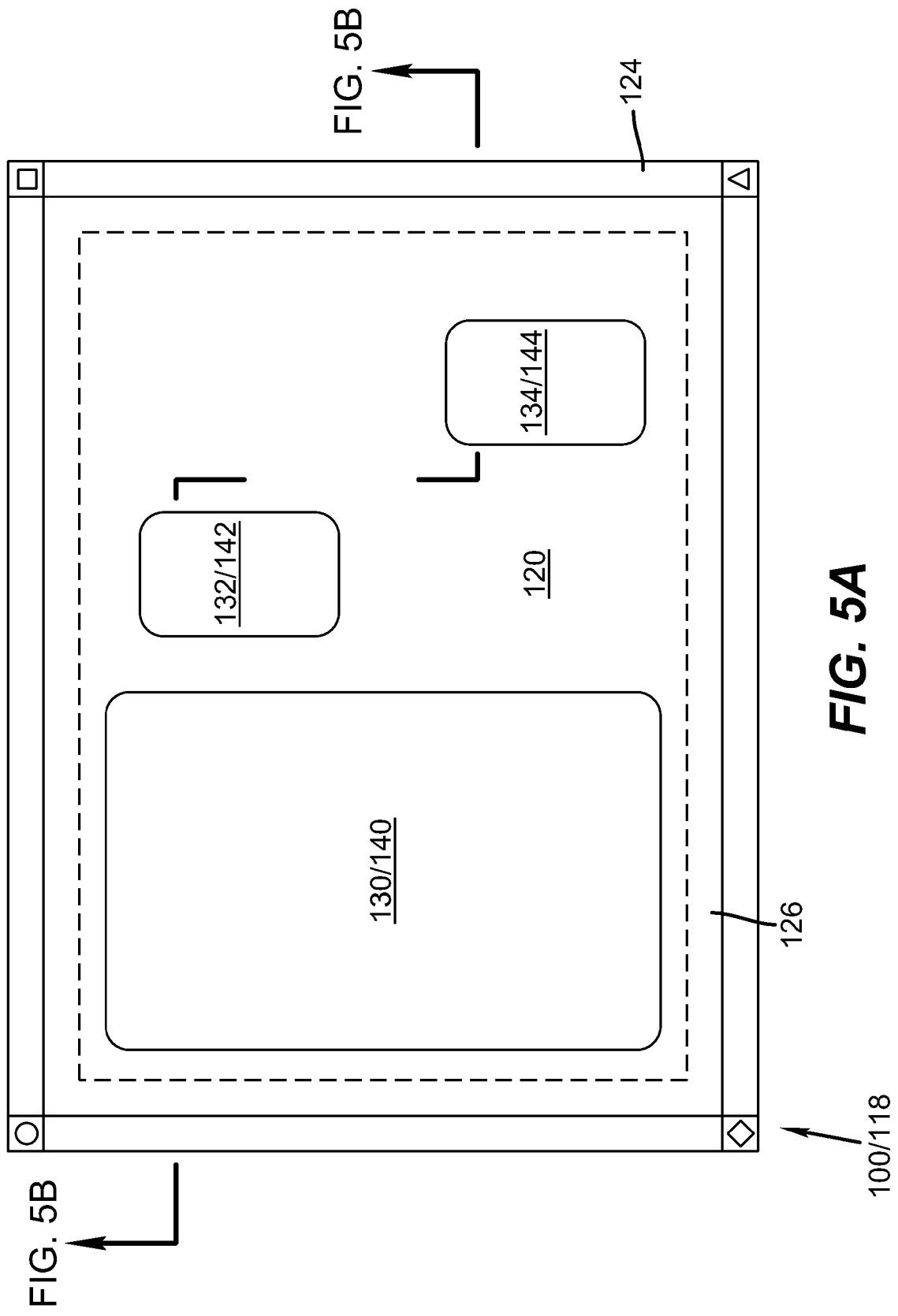

IMAGING PRODUCT LAYOUT SYSTEM

CROSS REFERENCE TO RELATED APPLICATION

Reference is made to commonly assigned, co-pending U.S. patent application Ser. No. 12/914,089 by Chinnici et al. filed of even date herewith entitled "Imaging Product Layout Method", the disclosure of which is incorporated herein by reference in its entirety.

FIELD OF THE INVENTION

The present invention relates to combining images with imaging-related products and, in particular, to a system and method for making an image-enhanced product.

BACKGROUND OF THE INVENTION

Products that include images are a popular keepsake or gift for many people. Such products typically include a picture taken by an individual that is inserted into a product intended to enhance the product, the presentation of the image, or to provide storage for the image. Examples of such products include picture frames, picture albums, posters, picture calendars, picture mugs, picture ornaments, picture mouse pads, and picture post cards.

Images can also be combined with other images, for example templates including background images and one or more image openings into which an individual's image can be inserted, either mechanically or electronically with a computer, to form a combined image that displays the individual's image in a pleasing or preferred manner. These image products can be provided in hard-copy form, for example as a printed photo-book, or in electronic form presented by a computer, for example in an on-line album.

Designing and assembling multi-image and multi-media products can be a daunting challenge for users, particularly when the products include personal images. Software tools that execute on computers can assist users in designing customized multi-image products. Such software products can execute, for example, on home computers. Alternatively, on-line design and printing services accessible through an internet browser interface can assist users in designing and printing a multi-image product.

Such software and internet design tools can enable users to locate personal images or other multi-media elements in a multi-image product, such as a photo-book or collage. For example, users can drag-and-drop image icons into openings in a visual representation of a multi-image product to specify the multi-image product, for example as is done in the on-line image printing business of the Kodak Gallery. However, such an approach to designing a multi-media image product can be very difficult, as a very large number of product options and different layouts are available and selecting from among them can be tedious, time-consuming, and anxiety-inducing for a user. Alternatively, software and internet design tools include automated layout software that will locate a user's images in various locations in a template without intervention, as is taught for example in U.S. Pat. No. 7,340,676. Such automated layout methods, however, do not always select the best or preferred layout for a product as desired by a user.

U.S. Patent Publication 20090196520 describes a system for generating an image-enhanced output product. An image-enhanceable product is identified having a tangible surface and a printing map that defines a plurality of window areas in which images are to be printed on the tangible surface. The disclosure describes the use of product identifiers to enable access to printing maps or printing information. The disclosure also describes scanning the image-enhanceable product to form an image that is analyzed to produce printing maps or printing information. The printing maps or printing information is used to make a print on the tangible surface suitable for enhancing the image-enhanceable product. This process requires the use of a database with printing map or printing information associated with image-enhanceable product identifiers. Alternatively, image-enhanceable product scanners and computing algorithms are necessary for producing a printing map or printing information.

There is a need therefore, for an improved method for providing image maps or printing information for image-enhanceable products.

SUMMARY OF THE INVENTION

According to a preferred embodiment of the present invention, there is provided an imaging kiosk comprising a printer, a reader for reading frame-specification information specifying two or more image openings in a picture frame, an image-acquisition device, a computer system connected to the printer, the reader, and the image-acquisition device. The computer system comprises circuitry for acquiring images with the image-acquisition device, circuitry for rendering two or more of the acquired images onto a single printable medium having the two or more acquired images located in positions corresponding to the two or more image openings, and circuitry for printing the rendered printable medium on a connected printer to make a frame-matched multi-image print. The frame-specification information includes image-opening locations and image-opening sizes of the two or more image openings, and can include information such as picture frame type, picture frame color, picture frame thickness, image preferences and image attributes. The image-acquisition device can include a scanner, a digital camera, a communication network, or a solid-state memory. The frame-specification reader includes a device such as an image scanner, a digital camera, or a barcode scanner. The frame-specification information is located on the picture frame, located on a picture-frame package, or printed on a medium. The medium is selected from a sticker adhered to the picture frame or picture-frame package, a printed sheet enclosed in the picture-frame package, or a printed sheet associated with the picture-frame package. The frame-specification information is a machine-readable code such as a one-dimensional barcode, a circular barcode, a two-dimensional barcode, or a pictogram. If a pictogram is selected it can have an illustration of the picture frame and image openings in the picture frame that correspond to the locations and sizes of the image openings in the picture frame. The pictogram includes graphic elements that encode frame-specification information. The graphic elements can include color, shape, icons, images, or fill patterns of the frame. The kiosk decodes the encoded frame-specification information to produce the image-opening locations and image-opening sizes of the picture frame openings. One or more images can be rendered to be larger than the corresponding image opening.

Another embodiment of the present invention includes a picture-frame product comprising a picture frame and a frame-specification code that is readable only by machine and that specifies two or more image openings in the picture frame. The code can be located the picture frame, on a picture-frame package, or a medium associated with a picture-frame. It can also specify picture frame type, picture frame color, picture frame thickness, image preferences, and image attributes. Its format can include a machine-readable code, a one-dimensional barcode, a circular barcode, a two-dimensional barcode, or a pictogram.

The present invention provides a simplified method for combining images with image-enhanceable products. This, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 5A and 5B show, respectively, a top view and a side view of another, non-limiting example of an image-enhanceable product comprising a conventional matte and frame combination;

DETAILED DESCRIPTION OF THE INVENTION

Figure 1:
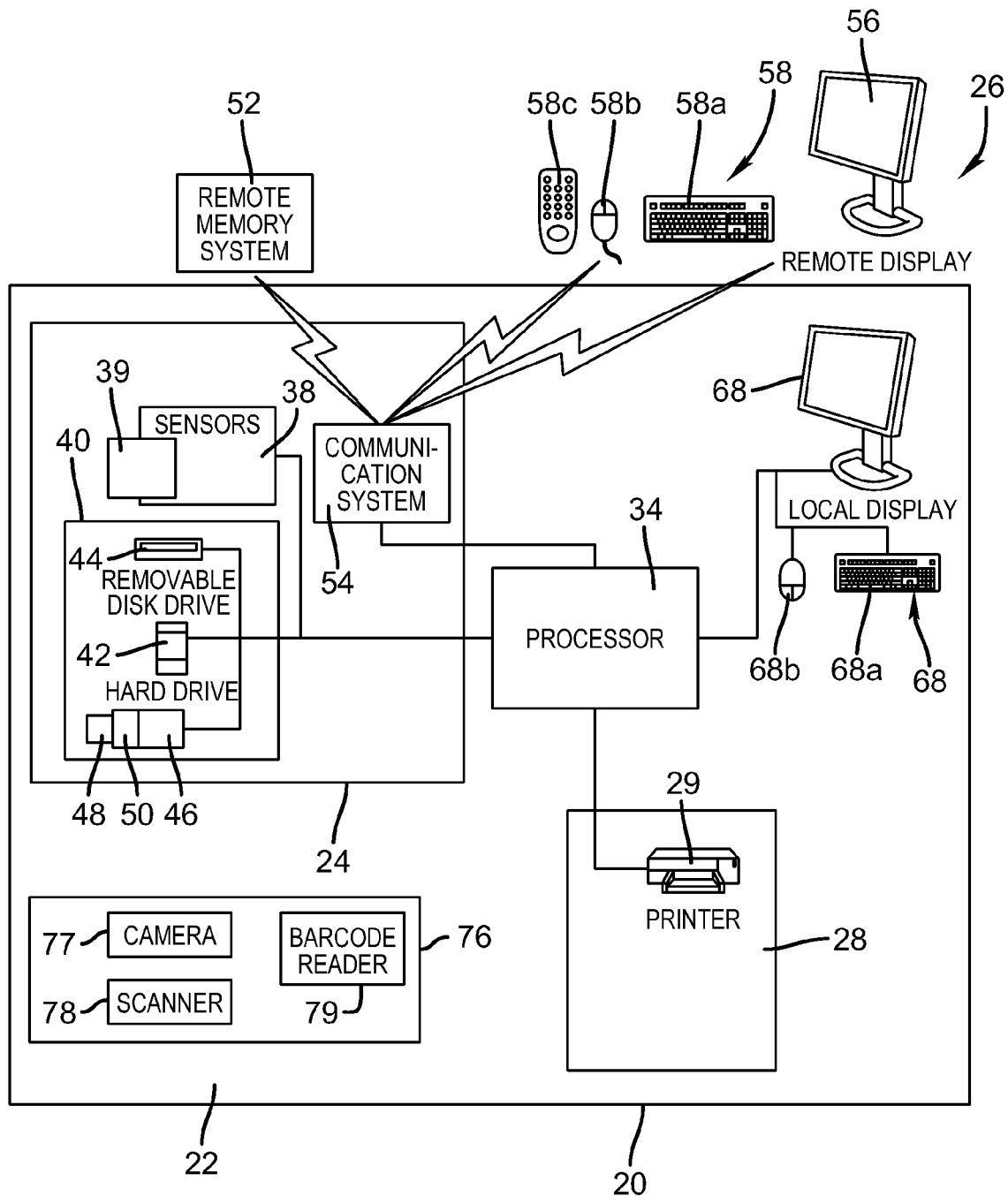
FIG. 1 shows an embodiment of a system for generating an image-enhanced product.

FIG. 1 illustrates a first embodiment of an electronic computer system 20 that can be used in generating an image-enhanced product. In the embodiment of FIG. 1, electronic computer system 20 comprises a housing 22 and a source of content data files 24, a user input system 26 and an output system 28 connected to a processor 34. The source of content data files 24, user-input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, and computer-generated images. Source of content data files 24 can optionally capture images to create content data for use in content data files by use of capture devices located at, or connected to, electronic computer system 20 and/or can obtain content data files that have been prepared by or using other devices. In the embodiment of FIG. 1, source of content data files 24 includes sensors 38, a memory 40 and a communication system 54. System 20 can include a local image input system 76, for example a digital camera 77, an image scanner 78, or a barcode scanner 79 controlled and operated by processor 34. Barcode scanner 79 can be a one-dimensional or two-dimensional barcode scanner and can include laser scanners as are known in the art.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the embodiment of FIG. 1, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 1, system 20 has a communication system 54 that in this embodiment can be used to communicate with an optional remote memory system 52, an optional remote display 56, and/or optional remote input 58. A remote input station including a remote display 56 and/or remote input controls 58 (also referred to herein as "remote input 58") can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 26 provides a way for a user of system 20 to provide instructions to processor 34. This allows such a user to make a designation of content data files to be used in generating an image-enhanced output product and to select an output form for the output product. User input system 26 can also be used for a variety of other purposes including, but not limited to, allowing a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 1, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 1. Similarly, local input 68 can take a variety of forms. In the embodiment of FIG. 1, local display 66 and local user input 68 are shown directly connected to processor 34.

Figure 2:
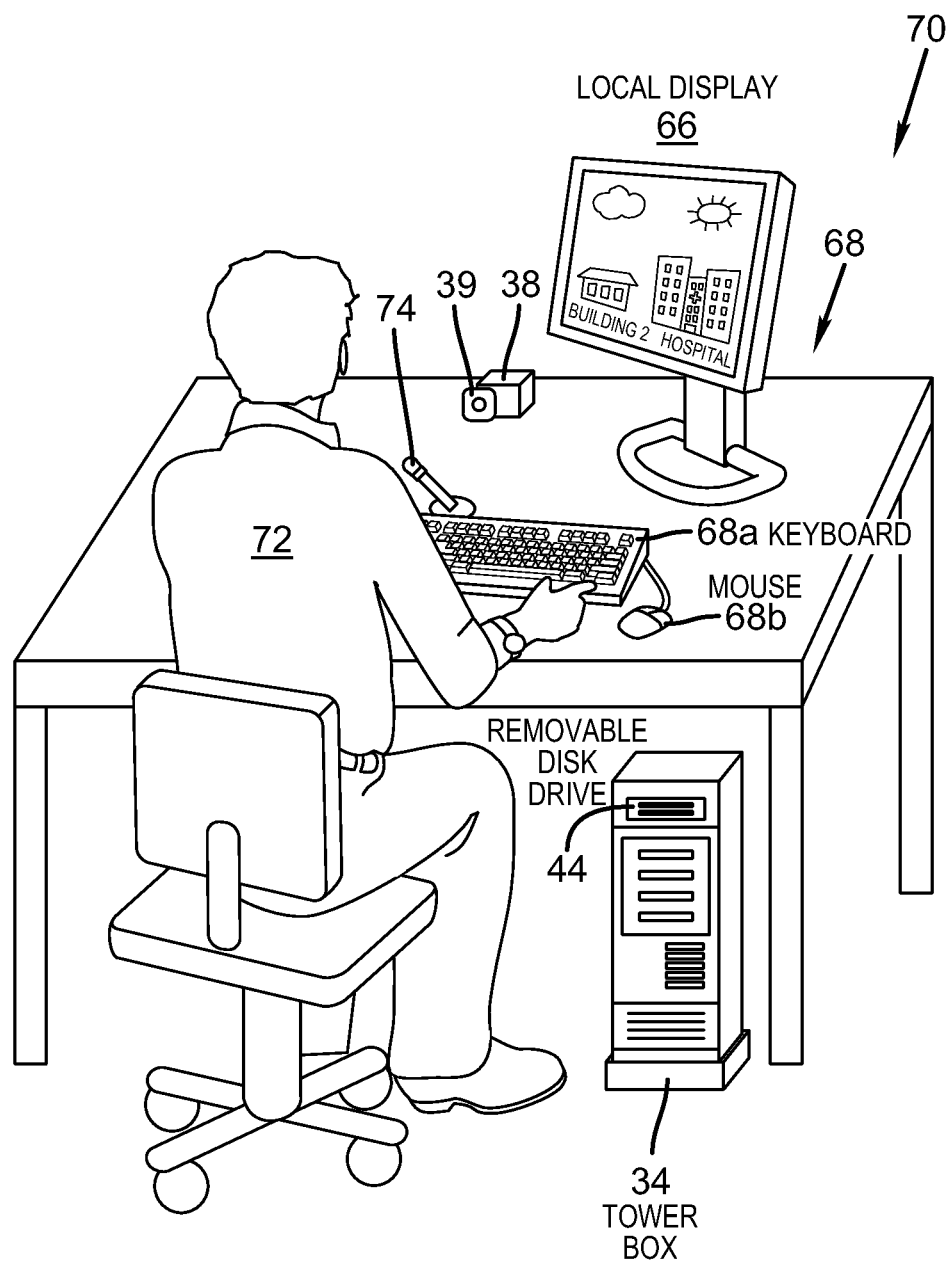
FIG. 2 shows an embodiment of a work station or kiosk that can be used in a system of FIG. 1.

As is illustrated in FIG. 2, local user input 68 can take the form of an editing studio or kiosk 70 (hereafter also referred to as an "editing area 70"). In this illustration, a user 72 is seated before a console comprising local keyboard 68a and mouse 68b and a local display 66 which is capable, for example, of displaying multimedia content. As is also illustrated in FIG. 2, editing area 70 can also have sensors 38 including, but not limited to, video sensors 39, audio sensors 74 and other sensors such as multispectral sensors that can monitor user 72 during a user or production session.

Output system 28 is used for rendering images, text or other graphical representations in a manner that allows image-enhanceable item to be converted into an image-enhanced product. In this regard, output system 28 can comprise any conventional structure or system that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 3:
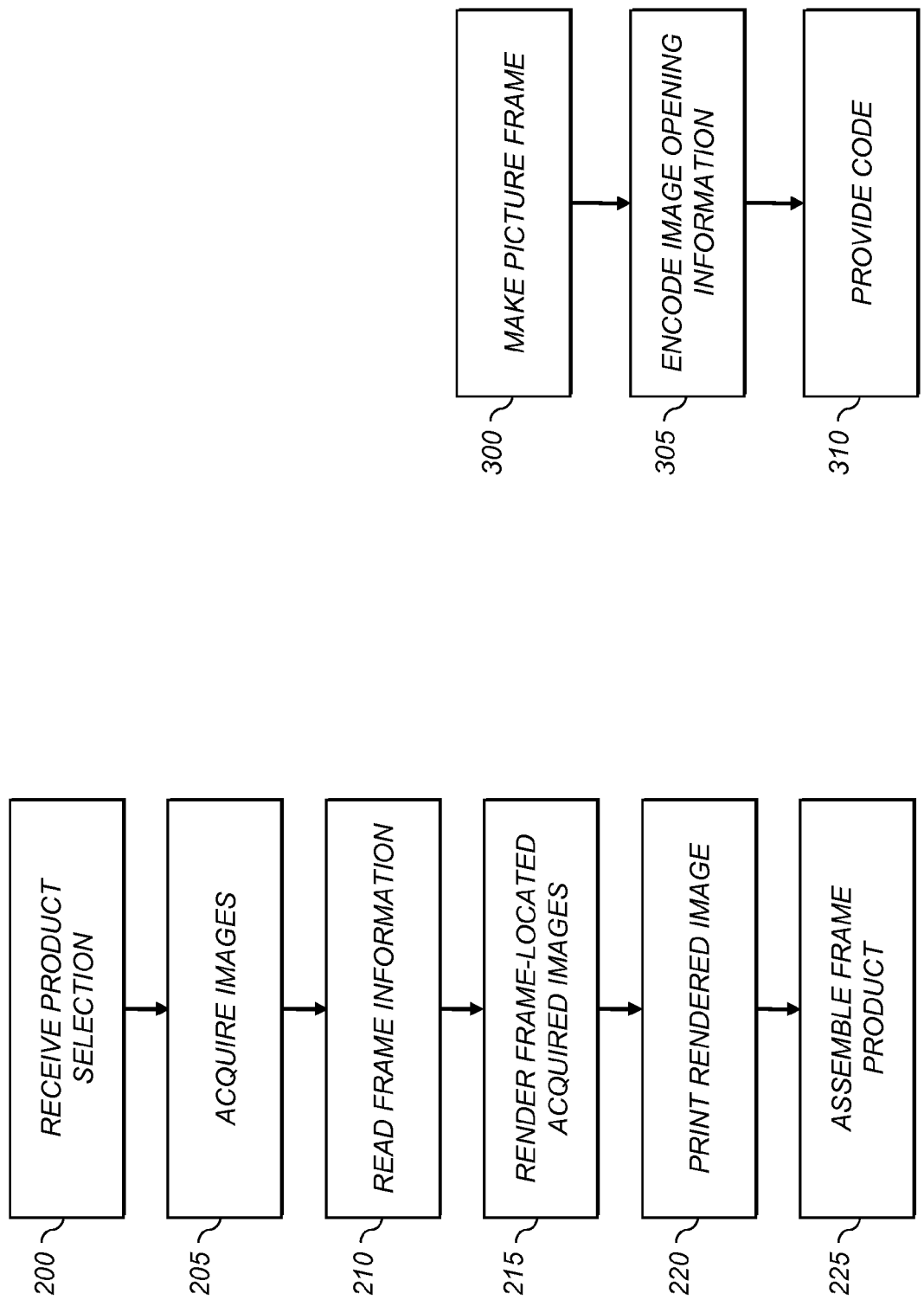
FIG. 3A is a flow graph illustrating a method of the present invention.
FIG. 3B is a flow graph illustrating another method of the present invention.

The system 20 of FIGS. 1 and 2 can be employed to make an image-enhanced output product. In various embodiments of the present invention, an image-enhanced output product can be a multi-image frame product, or a picture frame and are referred to interchangeably herein. Referring to FIG. 3A, in a method of the present invention, an image-enhanced product can be made by receiving a product selection, for example from a user selecting from a multi-image frame product list, in step 200. The selection can be made through a graphical user interface in a software application or by interacting with a suitable image-product website through a web browser, as is known in the computer interface art. The image-enhanced output product includes a plurality of image openings for receiving images. Referring also to FIGS. 1 and 2, product selection is typically done when a user input system 26 detects that user 72 has made a user input action that can be interpreted by processor 34 as a selection of one of a plurality of possible image-enhanceable items. Alternatively, the type of image-enhanceable item can be identified based upon stored information regarding user 72 or some other person, and including, but not limited to, user preferences, past user interactions and other factors. It will be appreciated that such an identification can be made automatically when, for example, it is determined that system 20 is optimized or otherwise configured to generate only one type of image-enhanced output product.

In step 205, images are acquired, for example from a user by scanning printed images on an image scanner (e.g. 78), by accessing a storage device such as a data CD or a solid-state memory (e.g. 40), such as from a camera, by downloading from a computer storage system accessed through a communications system (e.g. 54) or network, such as the internet. Such image acquisition methods are known in the computing arts. Typically, at least as many images are acquired as image openings are present in the selected multi-image frame product, although in some embodiments an image can be employed in a plurality of image openings. For example, different portions of an image resulting from different image crops can be employed. Hence, as understood herein, an acquired image can be considered to be two or more acquired images if it is used in two or more image openings.

Frame-specification information is read in step 210, for example from a machine-readable code printed on the multi-image frame product, on multi-image frame product packaging, or on printed media packaged with the multi-image frame product. Frame-specification information can include information specifying the attributes of the frame (for example, size, thickness, image openings, color, or material type) or attributes or preferences for images that can be combined with the multi-image frame product to form a complete image-enhanceable output product (for example, image color, image orientation, image type, or image content). The machine-readable code can include the location and sizes of image openings in the multi-image frame product.

Figure 7:
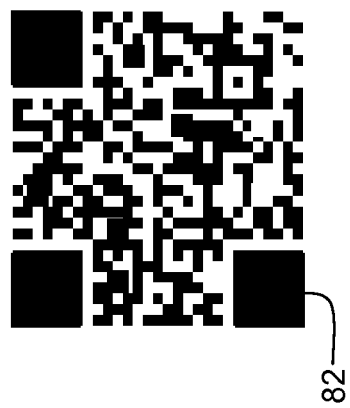
FIG. 7 is an illustration of a two-dimensional barcode known in the art and usefully employed with the present invention.

The machine-readable code can be a barcode with encoded information, for example a one-dimensional barcode, a circular barcode, or two-dimensional barcode (illustrated in FIG. 7). Such barcodes are known in the art. Two-dimensional barcodes can be used to encode up to several thousand characters of data and the characters can be structured as an XML-based template. The template description is metadata defining the image-enhanceable product image opening sizes, locations, and shapes and any matte hole sizes, locations, and shapes. In addition, other optional metadata included in the code can describe image selection criteria and compositing instructions, for example assigning acquired image types or content to specific image openings (e.g. a portrait) and image processing effects, such as sepia tone. Since the entire description of the product can be encoded into the barcode, there is no need for production kiosks to have pre-installed templates. New products can be designed and barcodes encoded to match the products without needing to update kiosks.

Products using this embodiment can have packaging on which is printed a corresponding barcode that encodes product information. Once the barcode is scanned using a barcode scanner attached to the kiosk, the software on the kiosk is able to decode and interpret the barcode data, determine the print size needed, and generate image masks appropriate for the product and matte. The kiosk software can then assist the consumer with selecting the required number of images from their input media to fill the product image openings. Any further image selection criteria and image processing effects that were encoded can be applied and a preview of the final product provided on the kiosk display. The print is then rendered and submitted for printing to an attached printer. The resulting print product will fit and align correctly in the product.

In an alternative embodiment of the present invention, the machine-readable code can be a pictogram (e.g. a human-readable glyph, pictograph, icon, or pictogram) visually illustrating the location of image openings in the multi-image frame product. Other codes can also be used as well as codes that combine, for example, barcodes with pictograms or other iconic representations. FIGS. 8A, 8B, 12, 13, and 14 illustrate pictograms 84 with illustrative image openings corresponding to the image openings 106, 108, 110 of FIG. 4. Code readers can include, for example, flat-bed scanners, digital cameras, or barcode scanners such as laser scanners.

Figure 8B:
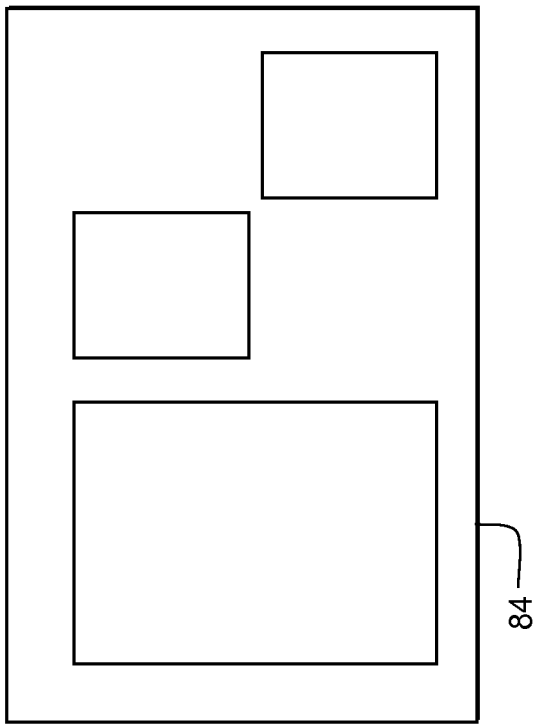
FIGS. 8A and 8B are illustrations of pictograms according to various embodiments of the present invention.
Figure 8A:
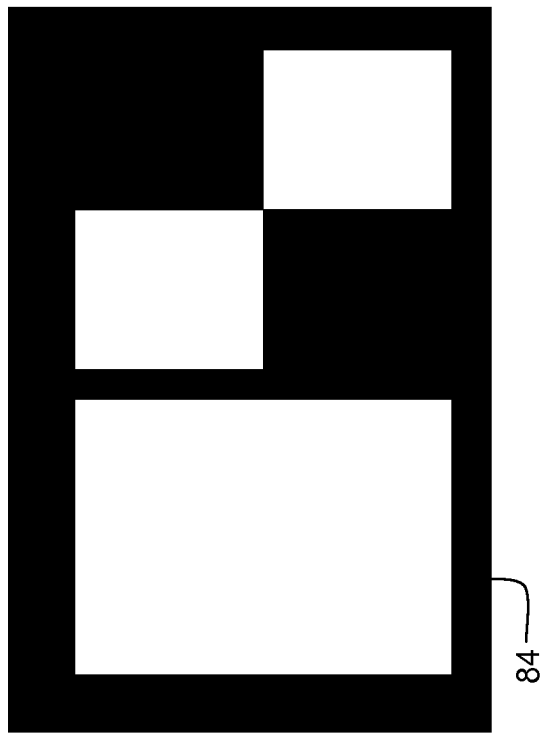

In one exemplary embodiment, the pictogram includes openings that correspond to and have the same size relative to an edge (e.g. the outside edge) of the pictogram as the image openings have to the corresponding multi-image frame product. The absolute size of the image openings or tangible surface on which images are printed can be determined either by a pre-determined value, by the size of a rendered print (e.g. image-sensitive sheets that are 5×7 inches, 8.5×11 inches, or A4 size or other standard sizes known in the art) or through additional information entered by the user or included with the frame product, for example text stating the relevant size of one or more product dimensions (e.g. 184 in FIG. 14). A variety of pictograms can be used to represent the image openings, e.g. as shown in FIGS. 8A and 8B, and are included as embodiments of the present invention.

Figure 8C:
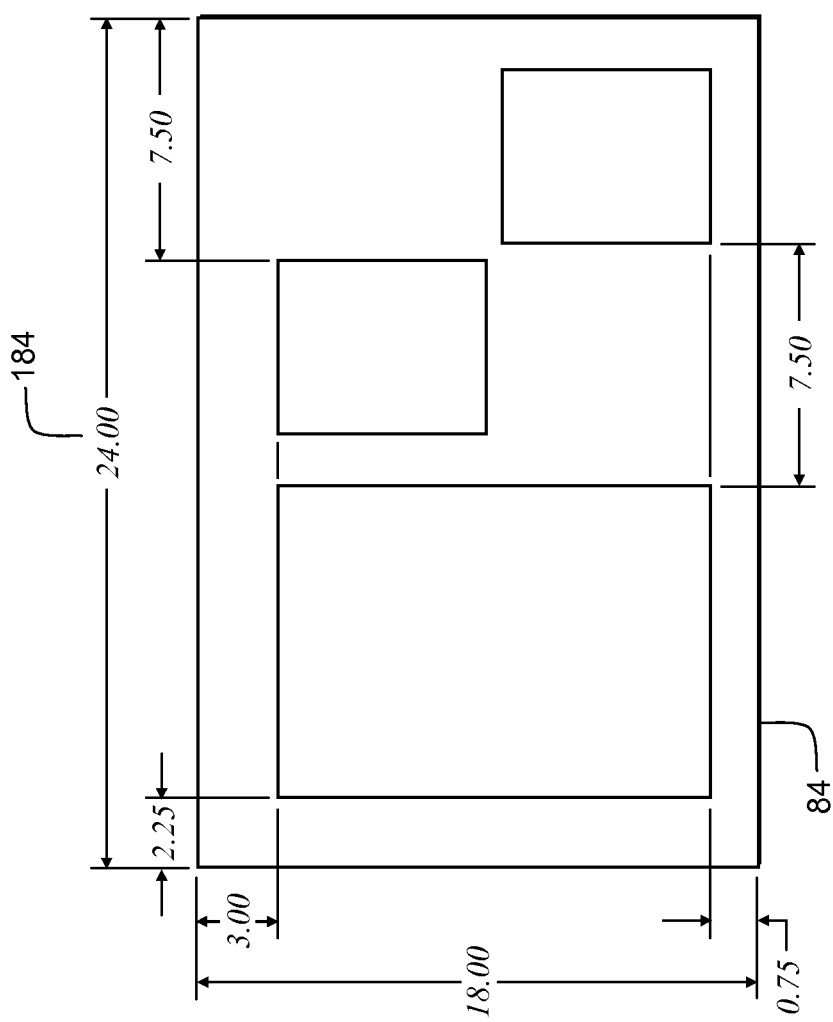
FIG. 8C illustrates the relative locations of openings in the pictogram in an example according to an embodiment of the present invention.

For example, referring to FIG. 8C in more detail, the pictogram 84 can be scanned to form a pictogram image. Image processing algorithms known in the art can be employed to measure the relative width and height of the pictogram image. In this illustrative example, the width to height ratio is 4:3, so that a width of 24 (e.g. cm) indicated with text 184 corresponds to a height of 18. The text 184 can be read using available character recognition software. Each of the separate rectangular openings in the pictogram image can be detected using known image analysis algorithms and their relative position in the pictogram image derived by counting the number of pixels between edges in each dimension. By comparing the relative position indicated by the arrows to the actual size indicated or calculated for the pictogram image, the actual location and size of each of the rectangular openings is determined. A print size is selected matching the size determined from the pictogram. Each of the rectangular openings is then used as a template within the print indicating where images are to be rendered. The images are selected with a user interface operated by a customer and then rendered into the openings. The image is then printed and mounted or inserted into the frame.

Figure 14:
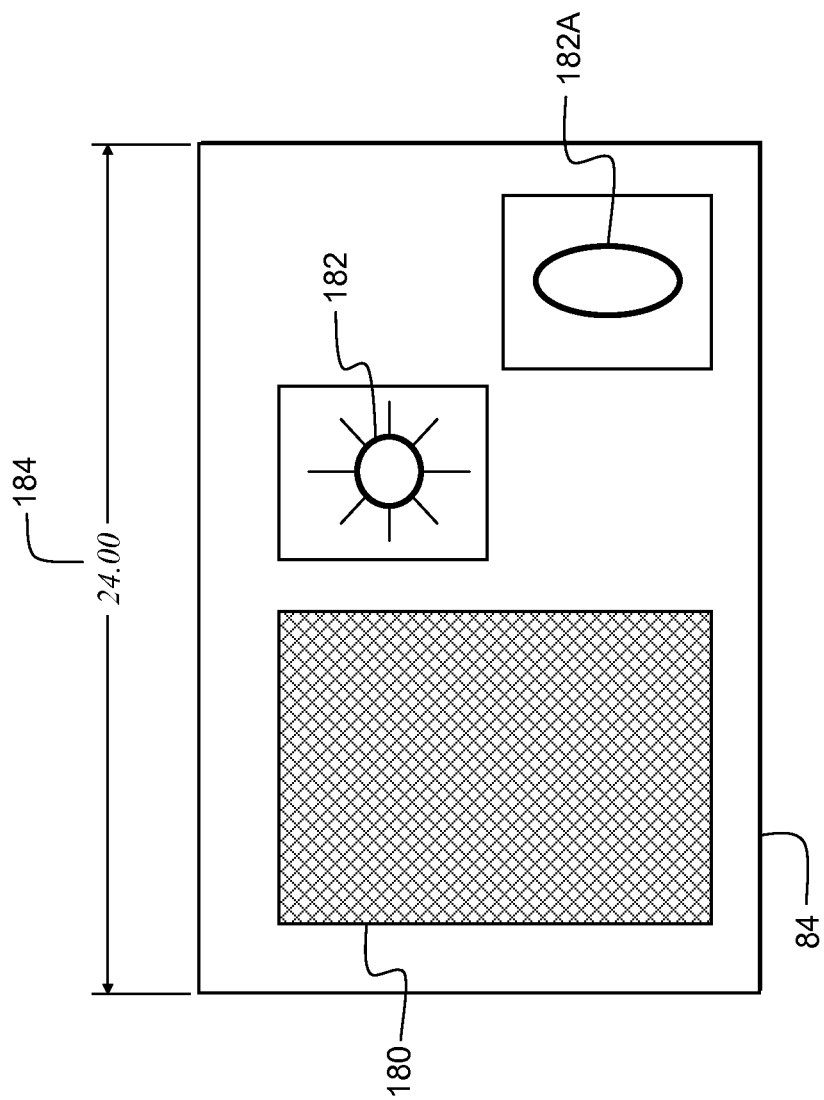
FIG. 14 is an illustration of a pictogram with coded image openings according to an embodiment of the present invention.

Referring to FIG. 14, the image openings can include patterns 180, colors, images, icons 182, 182A coded data or other information that further specifies information useful in making the image-enhanced output product. For example, some image openings can be designed for particular image types or orientations (e.g. a portrait image as indicated with icon 182A). The information presented in an image opening in a pictogram can be indicative of such preferences. Also, the pictogram colors, lines, shapes or other attributes can be used to provide information specifying the multi-image product or preferences for the multi-image product, including additional elements such as mattes (e.g. color, material, surface, appearance, or finish), print finish types, or protective elements (e.g. glass covers). In general, the pictogram can include graphic elements that specify elements or preferences for the image-enhanced output product. Pictogram codes have the advantage of being intuitively understood and read by humans and easily matched to corresponding products. Once the pictogram information is obtained, a user can interactively select images corresponding to the selected product as described above.

Referring again to FIG. 3A, in step 215, acquired images are rendered into a single rendered printable page having the two or more acquired images located and composited in positions corresponding to the two or more image openings in the multi-image frame product. Alternatively, one acquired image, or different portions of the same acquired image, can be used in two or more image openings, as noted above. The single rendered image is then printed in step 220. By a single rendered image is meant that the composited acquired images are rendered into a single image file, or one that is printed on a side of a single media sheet. The single printed image then matches the multi-image frame product and can be assembled with it in step 225 into a final image-enhanced output product.

According to various embodiments of the present invention, the frame-specification information is encoded and a method of the present invention further includes the step of decoding the frame-specification information to produce image-opening locations and image-opening sizes of the two or more image openings in the picture frame. The encoded frame-specification information can be a two-dimensional barcode or a pictogram. Other codes can be used. The pictogram can have an illustration of the picture frame and image openings in the picture frame that correspond to the locations and sizes of the image openings in the picture frame. The correspondence can be a relative location and size. A method of the present invention can further include the step of assembling the frame-matched image print in the picture frame.

Note that a multi-image frame product can be a conventional static frame that supports one or more images and typically hangs on a wall or rests on a desk, for example a wooden or plastic frame. Alternatively, however, other types of multi-image frame products can be employed. As used herein the term image-enhanceable item 100 includes anything that has a tangible surface 30 on which a plurality of images can be printed, fabricated, fanned, located, placed or otherwise provided. The tangible surface can be integral to the frame, for example with fabric transfer printing or silkscreening onto a fabric, or can be a separate surface mounted with a frame, for example a photosensitive sheet of paper, printer paper, or silver halide print material mounted behind a conventional frame. For example and without limitation, an image-enhanceable item 100 can take the form of a picture frame, collage, photo book, scrap book, photo calendar, mug, stein, cup, stemware, jewelry, tile, mosaic, home décor, mousepads, pillowcases, pen & pencil holders, a simulated or actual brushstroke image on canvas, a photo-realistic image on a canvas, a keepsake box, a fleece blanket, coasters, frames, ornaments, round ornament, snowflake ornament, filigree ornament, pewter ornament, holiday ornament set, annual ornament set, playing cards, puzzle, teddy bear or other stuffed animal, wall paper, packaging, apparel & accessories, including, but not limited to, a T-shirt, a tie, a tote bag, apron, baby onesie, performance shirt, and/or frame, matte and image combinations and collages, mailing labels, gift tags stamps, or any other tangible thing.

Figure 4:
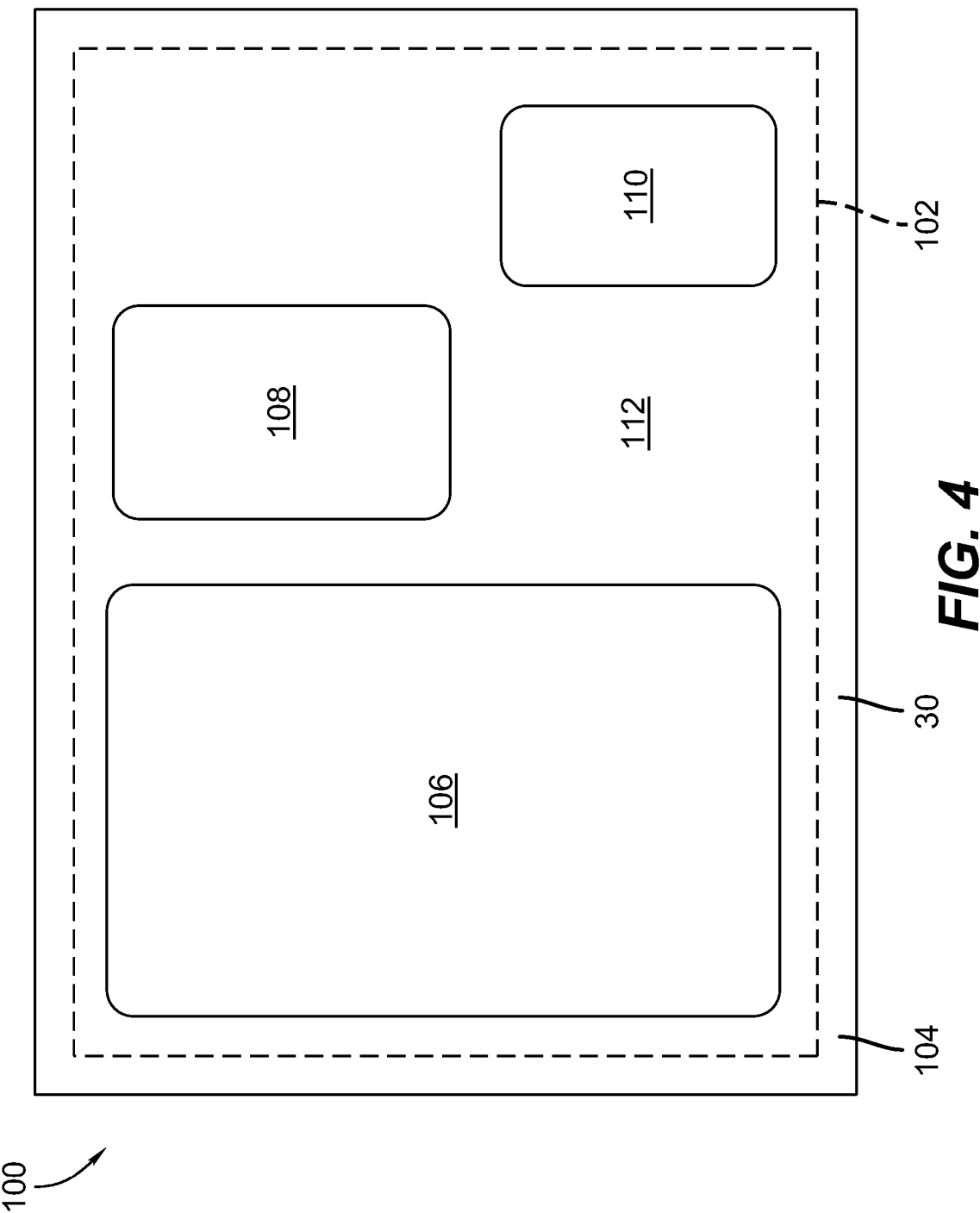
FIG. 4 illustrates one, non-limiting, example of an image-enhanceable item.

FIG. 4 shows one, non-limiting, example of an image-enhanceable item 100. As is shown in the embodiment of FIG. 4, this image-enhanceable item 100 comprises a tangible surface 30 that is provided in the form of a sheet. In this example, image enhanceable item 100 is shown having an image-receiving area 102 that comprises less than all of a first side 104 of tangible surface 30. However, it will be appreciated that image receiving area 102 can comprise the entire width and/or length and/or depth of tangible surface 30. In still other embodiments, the image receiving area 102 can comprise substantially less than all of an available tangible surface 30 of an image enhanceable item 100. As is also shown in FIG. 4, image-receiving area 102 can include a plurality of window areas 106, 108 and 110 where images are preferably recorded. Window areas are also described as image openings. Between window areas 106, 108 and 110 is an inter-window area 112. In other embodiments, inter-window area 112 can be blank, colored, textured, and/or can support images, text or other forms of graphic information, and/or can support, or can bear or can be left to bear other articles such as artifacts, separate labels or other items that can be joined to tangible surface 30. Inter-window area 112 can be reflective or translucent as desired, inter-window area 112 can also have a matte finish, glossy finish or semi-gloss finish as desired.

Figure 5B:
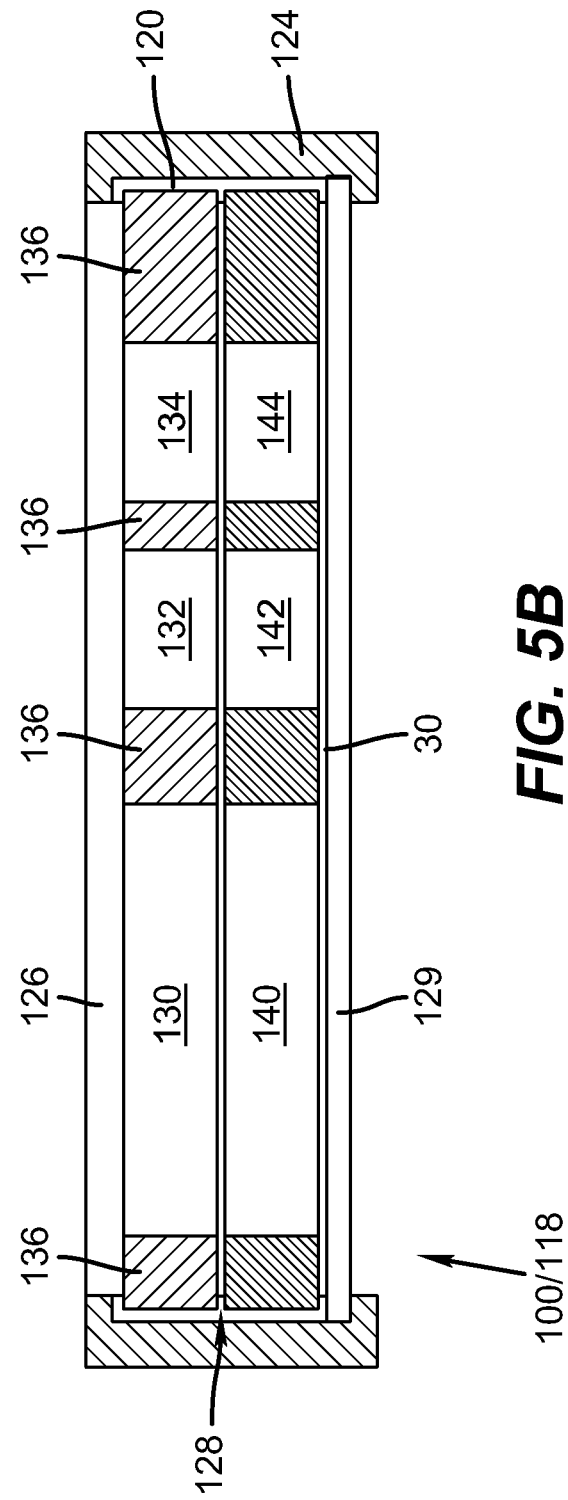

FIGS. 5A and 5B show, respectively, a top view and a section elevation view of another, non-limiting example of an image-enhanceable product 100. In this embodiment, image-enhanceable product 100 comprises a conventional matte and frame combination 118 having an external structural frame 124, with a light-transmissive area 126 and an internal area 128 that is adapted to hold a framing matte 120 and a tangible surface 30. In the embodiment of FIGS. 5A and 5B, framing matte 120 defines a plurality of windows 130, 132 and 134 that allow light to pass through an inter-window area 136 of framing matte 120 so that portions 140, 142 and 144 of tangible surface 30 that are registered with windows 130, 132 and 134 can be seen outside of framing system 120 while other portions of tangible surface 30 are blocked from view. In the embodiment that is illustrated, it is assumed that windows 130, 132 and 134 are essentially transparent and can optionally comprise openings through framing matte 120. However, it will be appreciated that in various embodiments, windows 130, 132, and 134 can comprise transparent or semi-transparent materials that allow light to pass therethrough in a modified form. For example, windows 130, 132, and 134 can filter, soften, or even selectively block portions of light passing therethrough as may be desired. In certain embodiments, liquid crystal display or other active or semi-active light blocking materials can be used. Further, in certain embodiments, filtering can be performed for artistic or aesthetic purposes, while in the same or other embodiments, filtering can be protective such as where the filtering blocks forms of light that can damage framing matte 120 or tangible surface 30 or damage images that are recorded thereon. Light-transmissive area 126 can similarly include such a light-transmissive material as desired.

In one example, ambient or other light passes through light-transmissive area 126 travels to framing matte 120 or onto tangible surface 30. This light is reflectively modulated by images 140, 142 and 144 and/or inter-window areas 136 of framing matte 120 and returns through light transmissive area 126 so that the modulated light is viewable outside of framing system 118. In this regard, light transmissive area 126 can comprise for example, and without limitation, an opening between an observer and framing matte 120 and tangible surface 30.

In the embodiment of FIGS. 5A and 5B, internal area 128 is also sized and shaped to hold an optional backing support 129, which can have, for example, mounting structures (not shown) such as hook mountings and the like defined therein. In other embodiments, internal area 128 can optionally be sized to hold a protection layer such as a glass or other transparent or semitransparent sheet (not shown) of conventional design to protect and/or hold framing matte 120 and tangible surface 30.

Figure 6:
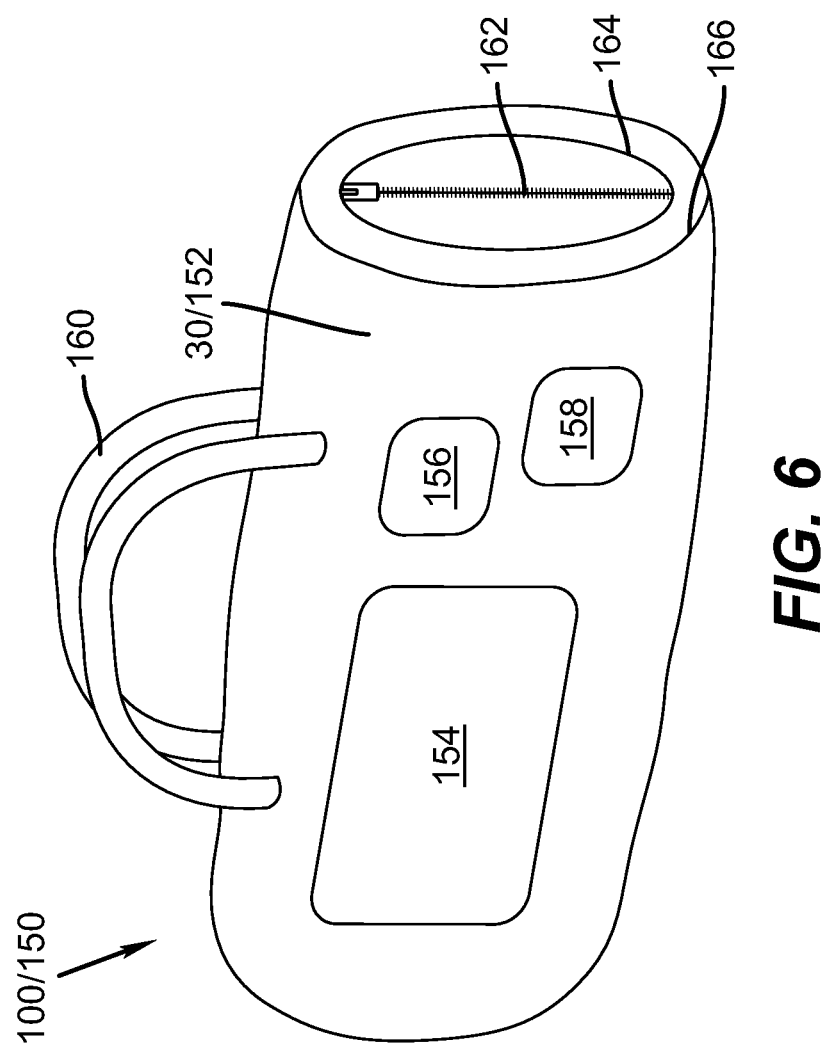
FIG. 6 illustrates another embodiment of an image-enhanceable product comprising a tote bag.

FIG. 6 illustrates yet another example of an image-enhanceable output product 100 comprising a conventional tote bag 150 having tangible surface 30 in the form of image-bearing surface 152 with window areas 154, 156, and 158 in which images can be provided. The window areas 154, 156, and 158 can be openings in the tote bag 150 material behind which a separate image sheet having a tangible printed surface (for example behind plastic protective sheets) is located, or the window areas 154, 156, and 158 can be areas on which images are actually printed, for example by transferring dyes or pigments into the tote bag 150 material surface 152. Here it will be also observed that tote bag 150 has straps 160, pocket area 162 and seams 164 and 166 that are visible image-bearing surface 152. As is illustrated in this example, the image enhanceable output product 100 can take any variety of forms.

In one embodiment of the present invention, a printing map is determined that defines a plurality of window areas in which images are to be printed on tangible surface 30. Each window is defined at least by a window shape and size, optionally, an available image resolution, and location information defining a location of the image window relative to tangible surface 30.

The window shape can be defined and encoded using any known logical system for defining shapes. For example and without limitation, the window shapes can be defined by reference to well-known geometric constructs, mathematical algorithms or in any other form or manner of defining a shape known in the art of image processing, geometry, computer science or other relevant arts.

The optional available image resolution for a particular window characterizes or identifies the extent to which image picture elements can be recorded within the window shape by output system 28. Typically, this available image resolution will be determined based upon a size and shape of a window and the density of picture elements that output system 28 can record on tangible surface 30.

The location information defines, in some manner, a location or position on tangible surface 30 in which the window shapes are to be defined. The location information can be located in any known fashion. For example, and without limitation, the location information can define a location of the window shape relative to the tangible surface based upon predetermined characteristics of the tangible surface 30, such as perforations, edge locations or margins of the tangible surface 30, or it can define the location of the window shape based upon markers, watermarks, printed text, printed images, seam locations, fabric patterns or other visible features on tangible surface 30. In other non-limiting examples, the location information can define a location for the a window based upon the location of other surfaces that are joined to tangible surface 30 such as for example, and without limitation, straps 160.

Images can be interactively assigned to specific image openings by a user, for example by using a graphical user interface with a drag-and-drop capability. Alternatively, images can be automatically assigned to specific image openings based on characteristics of the images (e.g. size or resolution) or an analysis of the image contents.

Figure 9:
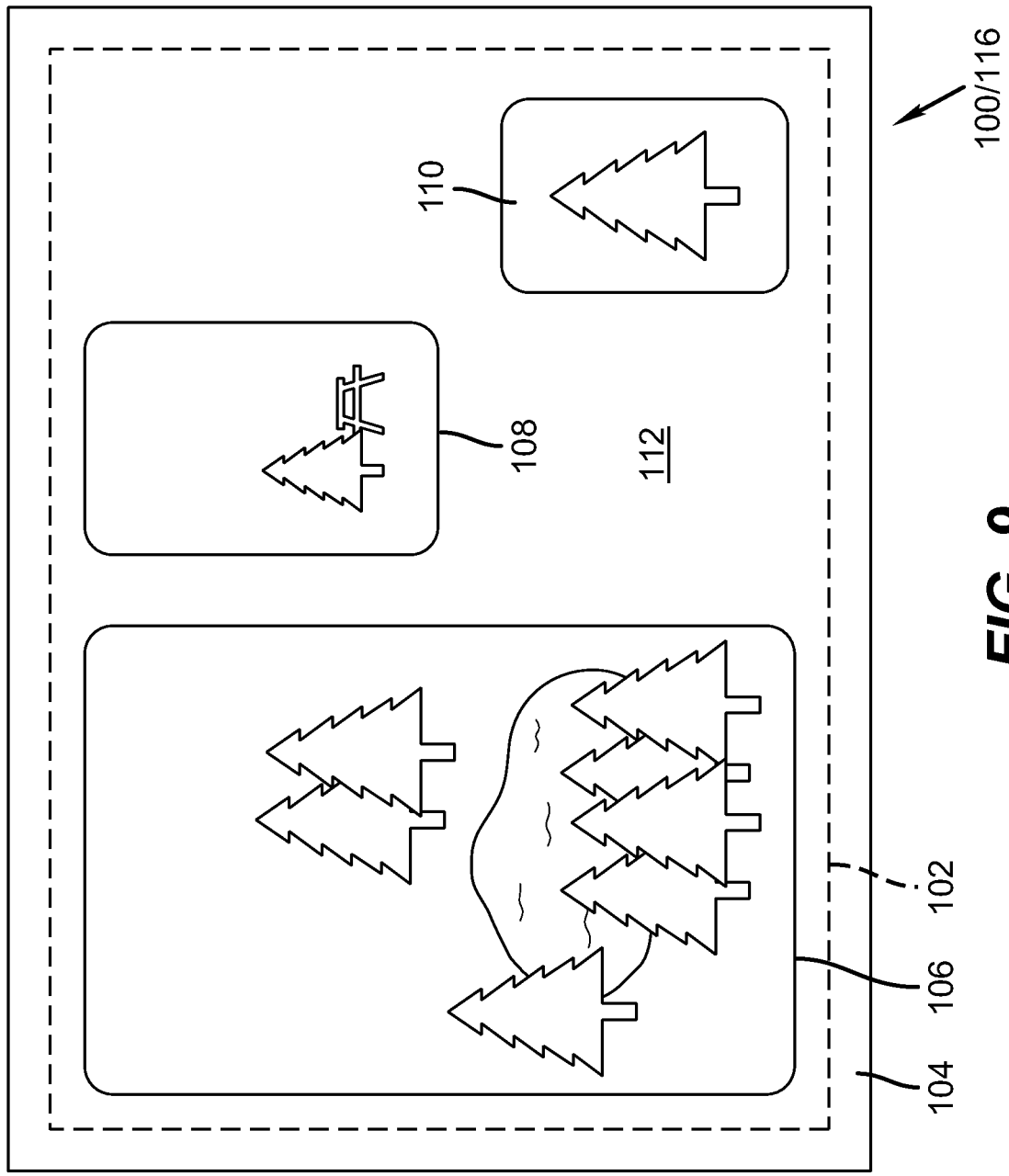
FIG. 9 shows one example of an image-enhanced output product.

It will be appreciated that an observer of a finished image-enhanced product will observe a product that has a number of visual components. These visual components can include but are not limited to tangible surface 30, framing matte 120 and the overall appearance of any other structures of image-enhanceable item 100 that will be visible when images are provided. FIG. 9 illustrates one example of an image-enhanced output product 116 that is formed based upon the image-enhanceable product 100 illustrated in the embodiment of FIG. 4. As is shown in FIG. 9, the overall appearance includes the inter-window area 112 as well as images that are recorded in window areas 106, 108 and 110.

Figure 10:
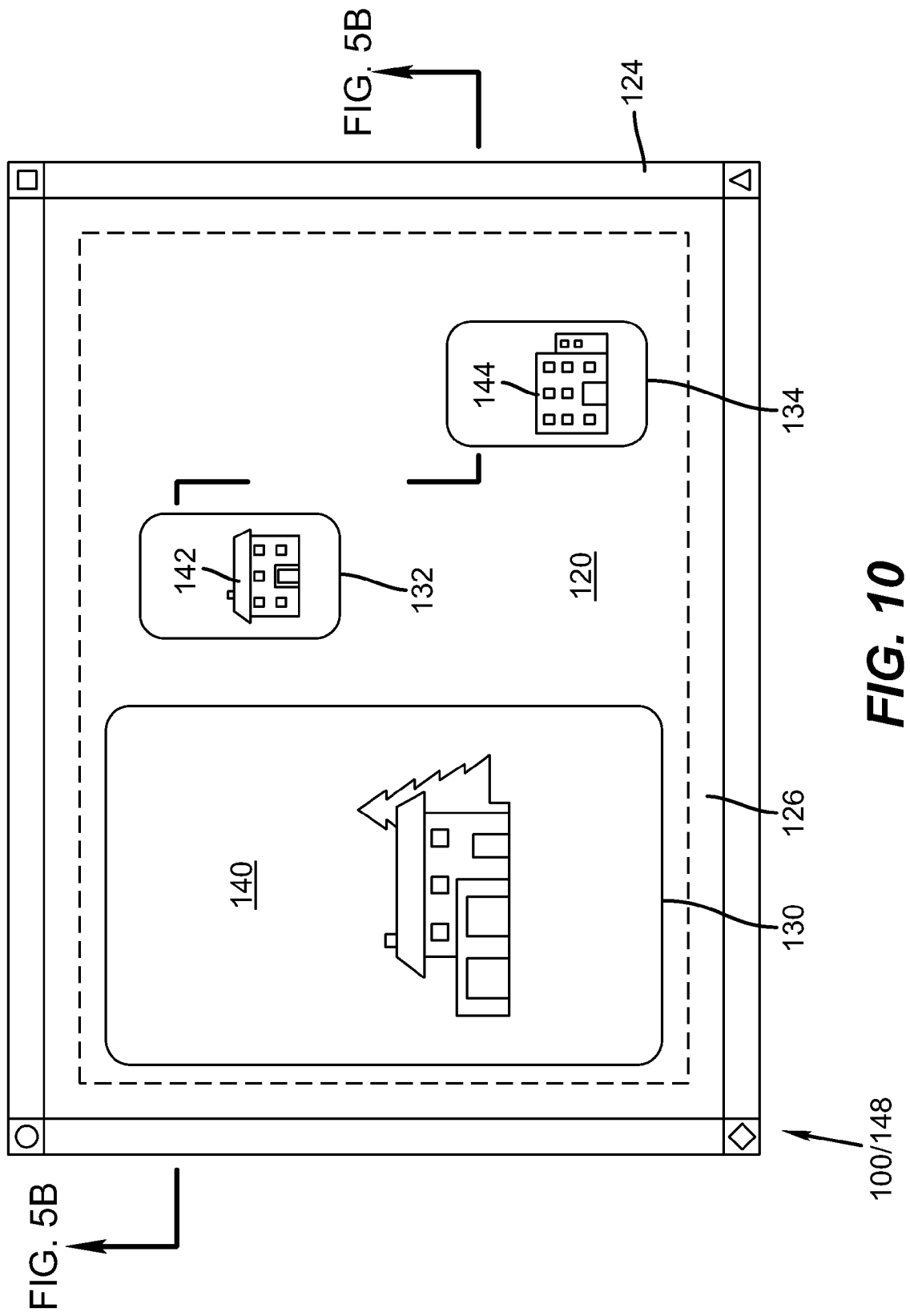
FIG. 10 shows another example of an image-enhanced output product.

Similarly, FIG. 10 illustrates one example of an image-enhanced output product 148 that is formed based upon the frame and matting combination 118 that is illustrated in the embodiment of FIGS. 5A and 5B. As is shown in FIG. 10, the image-enhanced object includes images 140, 142 and 144, the framing matte 120 and the structural frame 124. Further, the embodiment of FIGS. 5A and 5B can include any material in light-transmissive area 126 or in windows 130, 132, or 134.

Figure 11:
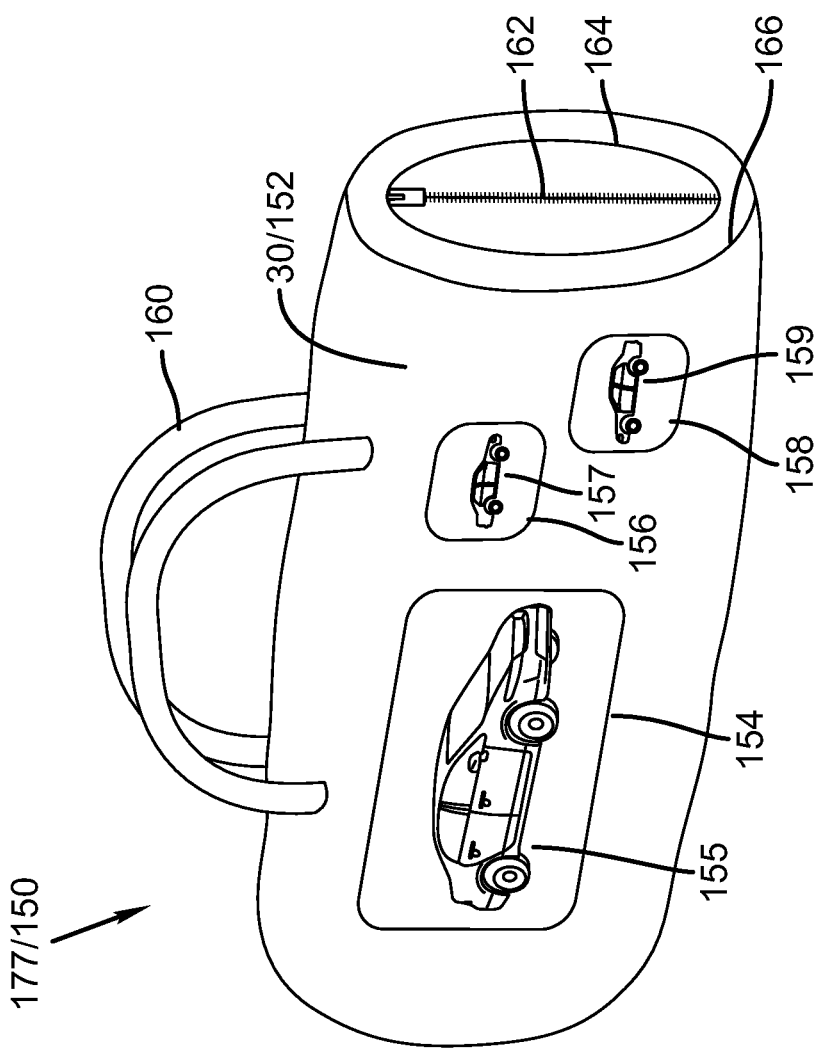
FIG. 11 shows another example of an image-enhanced output product.

FIG. 11 illustrates an example of an image-enhanced output product 177 formed comprising a conventional tote bag 150 having tangible surface 30 in the form of image bearing surface 152 with window areas 154, 156, and 158 in which images 155, 157 and 159 have been provided. Here it will be also observed that tote bag 150 has straps 160, pocket area 162 and seams 164 and 166 that are visible image-bearing surface 152.

Figure 12:
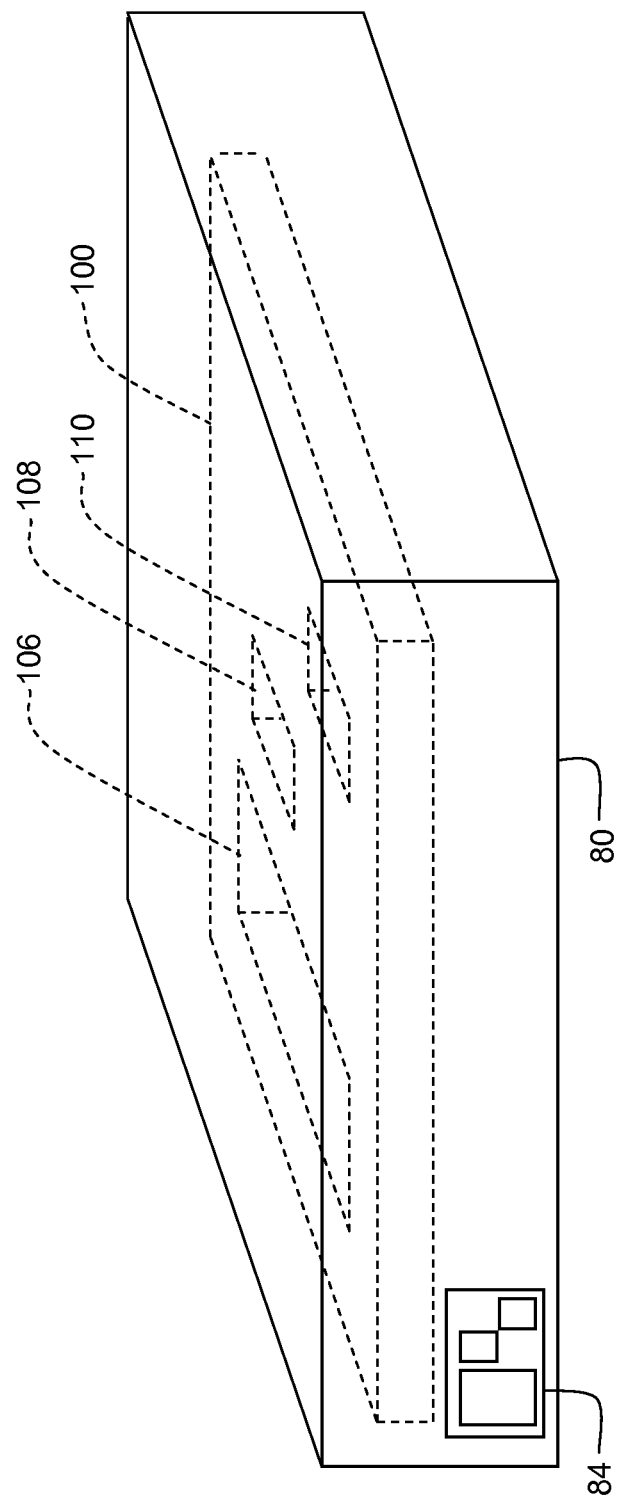
FIG. 12 is an illustration of a multi-image frame product package with a pictogram according to an embodiment of the present invention.
Figure 13:
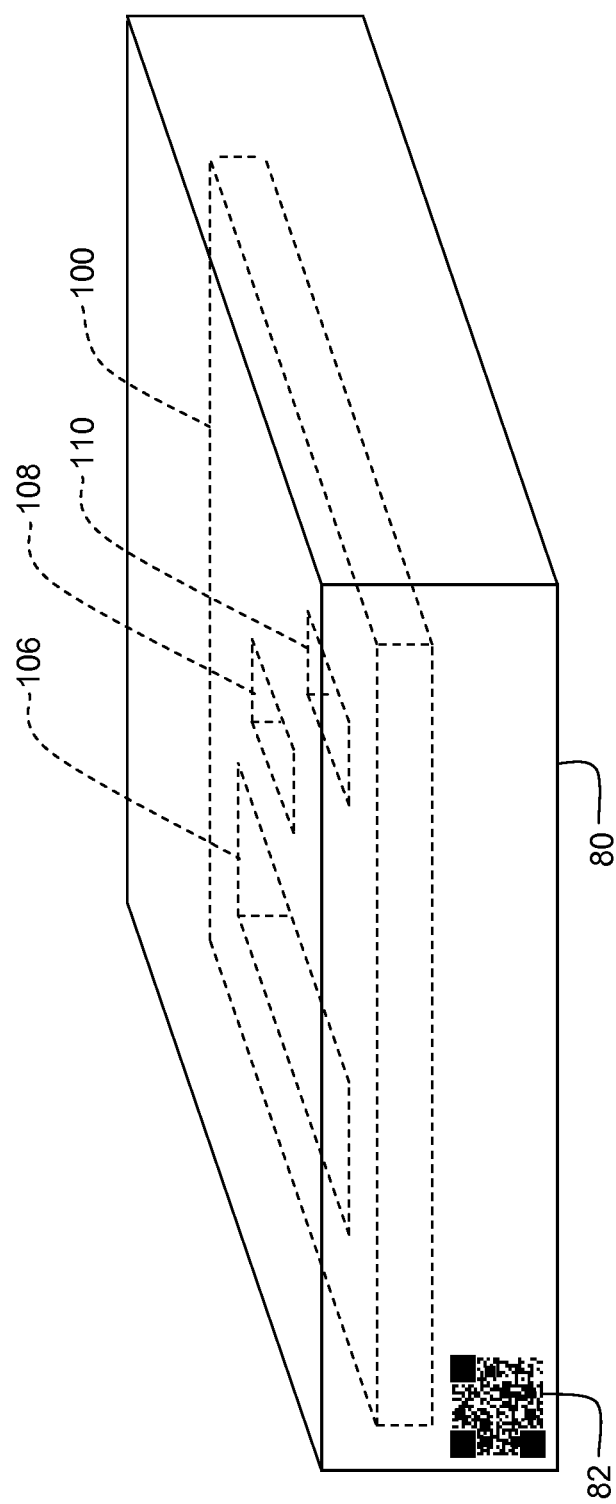
FIG. 13 is an illustration of a multi-image frame product package with a two-dimensional barcode according to an embodiment of the present invention.

According to one embodiment of the present invention and as illustrated in FIGS. 1 and 2, an imaging kiosk comprises an image printer 29, for example as part of an output system 28. A frame-specification reader, for example an image scanner 78, digital camera 77, or barcode scanner 79 as part of a local image-input system 76 reads frame-specification information specifying two or more image openings in a picture frame (e.g. an image-enhanceable item such as 100 in FIG. 4). The frame-specification information can be, for example, encoded in a two-dimensional barcode 82 as shown in FIG. 7 or a pictogram 84 as illustrated in FIGS. 8A and 8B. Referring to FIG. 12, a multi-image frame product package 80 includes a printed pictogram 84 and FIG. 13 illustrates a multi-image frame product package 80 that includes a printed two-dimensional barcode 82.

The imaging kiosk includes an image-acquisition device, for example an image scanner 78, digital camera 77, or barcode scanner 79 as part of a local image-input system 76 (FIGS. 1 and 2). A computer system (e.g. processor 34) controls the image printer 29, the frame-specification reader (e.g. 77, 78, or 79), and the image-acquisition device (e.g. 77 or 78). The computer system includes computer system circuitry for acquiring images with the image-acquisition device (e.g. 77 or 78), computer system circuitry for rendering two or more acquired images into a single rendered printable image or a printed page having the two or more acquired images printed thereon wherein the two or more acquired images are located in positions corresponding to the two or more image openings, and computer system circuitry for printing the rendered printable image to make a frame-matched multi-image print (e.g. 116 in FIG. 9).

The frame-specification information can include image-opening locations and image-opening sizes of the two or more image openings (e.g. 106, 108, or 110 as illustrated in FIG. 4) in the picture frame (e.g. image-enhanceable item 100). The image-acquisition device can include a print scanner, a digital camera, a communication network, or a solid-state memory. The frame-specification reader can include an image scanner, a digital camera, or a barcode scanner. The frame-specification information can be located on the picture frame, located on a picture-frame package, or printed on a medium associated with a picture-frame (e.g. as illustrated in FIGS. 12 and 13). In the latter case, the medium can be a sticker adhered to the picture frame or picture-frame package or a printed sheet enclosed in the picture-frame package or a printed sheet associated with the picture-frame package.

The frame-specification information can be encoded in a barcode, for example a one-dimensional barcode or a two-dimensional barcode (82 as illustrated in FIG. 7) in which the frame-specification information is encoded. Other coding or codes can also be employed. The computer system then includes circuitry for decoding the encoded frame-specification information to produce the image-opening locations and image-opening sizes of the two or more image openings in the picture frame.

Alternatively, the frame-specification information can be a pictogram. In this alternative case, the pictogram can have an illustration of the picture frame and image openings in the picture frame as shown in FIGS. 8A and 8B). The pictogram illustration of the picture frame and image openings in the picture frame can correspond to the locations and sizes of the image openings in the picture frame; the correspondence can be a relative location and size.

The single rendered printable image page can include printing composited images slightly larger than the image openings to facilitate assembly in the multi-image frame product. Thus, the computer system includes circuitry for rendering at least one image larger than the corresponding image opening.

In another embodiment of the present invention, referring to FIGS. 12 and 13, a picture-frame product comprises a picture frame (e.g. 100) and a frame-specification code (e.g. 82, 84) specifying two or more image openings (e.g. 106, 108, and 110) in the picture frame 100. The frame-specification code can be located on the picture frame, on a picture-frame package (as shown in FIGS. 12 and 13), or printed on a medium associated with a picture-frame. The frame-specification code can include image-opening locations and image-opening sizes of the two or more image openings in the picture frame. The code can be a two-dimensional barcode or a pictogram. The pictogram can have an illustration of the picture frame and image openings in the picture frame. The illustration of the picture frame and image openings in the picture frame can correspond to the locations and sizes of the image openings in the picture frame. The correspondence is a relative location and size.

Referring to FIG. 3B, in yet another embodiment of the present invention, a method of making a picture-frame product comprises the steps of making a picture frame having two or more image openings (step 300), encoding the image opening sizes and locations into a frame-specification code (step 305), and providing the frame-specification code in association with the picture frame (step 310). The frame-specification code can be printed on a frame package, on printed material associated with the picture frame, or on printed material enclosed with a frame package. The frame-specification code can be a two-dimensional barcode or a pictogram. Alternatively, other codes can be employed. The pictogram can have an illustration of the picture frame and image openings in the picture frame. The illustration of the picture frame and image openings in the picture frame can correspond to the locations and sizes of the image openings in the picture frame. The correspondence can be a relative location and size.

Providing single, rendered prints that include multiple user images located and sized to correspond with multi-image frame products simplifies assembly and reduces the cost of the multi-image frame product. Furthermore, a single rendered print can be quicker and simpler to make and have lower cost. Furthermore, producing a single rendered print with composited user images enables more consistent color and image-quality management, providing a higher-quality product.

The present invention provides an advantage in providing frame information. Prior-art methods that employ a frame product identifier to access frame information require a database of frame-specification information, either stored locally within the computer system with which an image product is to be made or remotely stored and accessed through a computer network. This database must be maintained with corrections, updates, and deletions as various frame products are made available, modified, or removed from the marketplace. In contrast, the present invention provides the needed frame-specification information directly on the frame product, associated with the frame product, or the frame product packaging, so that no database need be stored accessed, or maintained. The scanning equipment necessary to read the frame-specification information is readily available and can be the same as that needed to scan images. Furthermore, the frame-specification information can be used to validate the product packaging and contents or provide information to a customer that is not available from an identification code such as a Universal Product Code (UPC) symbol.

Furthermore, prior-art methods that employ a scanner to scan the outline of a frame product identifier require a scanner and algorithms to determine the frame-specification information. Scanning the frame itself requires that the frame package must be opened, which is problematic in a commercial setting. If the frame is then not purchased, the product and package must be re-assembled. In contrast, the present invention provides the needed frame-specification information directly on the frame product or the frame product packaging, so that no additional scanning or package manipulation is necessary.

The invention has been described in detail with particular reference to certain preferred embodiments thereof, but it will be understood that variations and modifications can be effected within the spirit and scope of the invention.

PARTS LIST 20 system
22 housing
24 source of content data files
26 user input system
28 output system
29 printer
30 tangible surface
34 processor
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 editing studio or kiosk
72 user
74 audio sensors
76 local image input system
77 digital camera
78 image scanner
79 barcode scanner
80 frame product package
82 two-dimensional barcode 84 pictogram
100 image-enhanceable item, multi-image frame product, picture frame
102 image receiving area
104 first side of image receiving area
106 window area, image opening
108 window area, image opening
110 window area, image opening
112 inter-window area
116 image enhanced output product, frame product
118 matte and frame system
120 framing matte
124 structural frame
126 light transmissive area
128 internal area
129 backing area
130 window
132 window
134 window
140 images
142 images
144 images
148 image enhanced output product
150 tote bag
152 image bearing surface
154 window area, image opening
155 images
156 window area, image opening
157 images
158 window area, image opening
159 images
160 straps
162 pocket area
164 seams
166 seams
177 image enhanced output product
180 pattern fill
182 icon
182A icon
184 text
200 receive product selection step
205 acquire images step
210 read frame information step
215 render frame-located acquired images step
220 print rendered image step
225 assemble frame product step
300 make picture frame step
305 encode image opening information step
310 provide code step

The invention claimed is:

1. An imaging kiosk, comprising:
a printer;
a reader for reading machine-readable encoded frame-specification information located on an item selected from the group consisting of a picture frame package and a print-receivable medium,
wherein the print-receivable medium is either adhered to the picture frame package or enclosed in the picture-frame package; and
wherein the frame-specification information includes information directly specifying two or more image openings in the picture frame and a print size of two or more images;
an image-acquisition device; and
a computer system connected to the printer, the reader, and the image-acquisition device, the computer system including:
circuitry for acquiring images with the image-acquisition device;
circuitry for decoding the encoded frame-specification information directly from the machine-readable code;
circuitry for rendering two or more acquired images onto a single printable medium according to the frame-specification information; and
circuitry for printing the rendered printable medium on the printer to make a frame-matched multi-image print.

2. The imaging kiosk of claim 1, wherein the image-acquisition device includes a device selected from the group consisting of: a print scanner, a digital camera, a communication network, and a solid-state memory.

3. The imaging kiosk of claim 1, wherein the reader includes a device selected from the group consisting of: an image scanner, a digital camera, and a barcode scanner.

4. The imaging kiosk of claim 1, wherein the encoded frame-specification information is located on the print-receivable medium, and the print-receivable medium is selected from the group consisting of an adhesive sticker and a printed sheet.

5. The imaging kiosk of claim 1, wherein the frame-specification information is encoded in a format selected from the group consisting of a one-dimensional barcode, a circular barcode, and a two-dimensional barcode.

6. The imaging kiosk of claim 1, wherein the frame-specification information is encoded as a pictogram.

7. The imaging kiosk of claim 6, wherein the pictogram has an illustration of the picture frame and image openings in the picture frame.

8. The imaging kiosk of claim 7, wherein the illustration of the picture frame and image openings in the picture frame correspond to the locations and sizes of the image openings in the picture frame.

9. The imaging kiosk of claim 8, wherein the correspondence is a relative location and size.

10. The imaging kiosk of claim 6, wherein the pictogram further includes graphic elements that encode frame-specification information.

11. The imaging kiosk of claim 10, wherein the graphic elements are selected from the group consisting of color, shape, icons, images, and fill patterns.

12. The imaging kiosk of claim 1, wherein the circuitry for rendering the two or more images includes circuitry for rendering at least one image larger than the corresponding image opening.

13. A picture-frame product comprising:
a picture frame having two or more image openings; and
encoded frame-specification information that is readable only by machine,
wherein the encoded frame-specification information is located on an item selected from the group consisting of a picture frame package and a print-receivable medium, wherein the print-receivable medium is either adhered to the picture frame package or enclosed in the picture frame package; and
wherein the frame-specification information includes information that directly specifies the two or more image openings in the picture frame and a print size of two or more images.

14. The picture-frame product of claim 13, wherein the frame-specification information is encoded in a format selected from the group consisting of a one-dimensional barcode, a circular barcode, a two-dimensional barcode, and a pictogram.

15. The picture-frame product of claim 14, wherein the pictogram has an illustration of the picture frame and image openings in the picture frame.

16. The picture-frame product of claim 15, wherein the illustration of the picture frame and image openings in the picture frame correspond to the locations and sizes of the image openings in the picture frame.

17. The picture-frame product of claim 16, wherein the correspondence is a relative location and size.

18. The picture-frame product of claim 14, wherein the pictogram includes graphic elements that encode the frame-specification information.

19. The picture-frame product of claim 18, wherein the graphic elements are selected from the group consisting of color, shape, icons, images, and fill patterns.

* * * * *